(12) United States Patent  
Andle et al.

(10) Patent No.: US 8,532,448 B1  
(45) Date of Patent: Sep. 10, 2013

(54) LIGHT EMITTING PIXEL STRUCTURE USING TAPERED LIGHT WAVEGUIDES, AND DEVICES USING SAME

(71) Applicant: Solarsort Technologies, Inc., Barrington, RI (US)

(72) Inventors: Jeffrey C Andle, Falmouth, ME (US); Shalom Wertsberger, Barrington, RI (US)

(73) Assignee: Solarsort Technologies, Inc., Barrington, RI (US)

( * ) Notice: Subject to any disclaimer, the term of this patent is extended or adjusted under 35 U.S.C. 154(b) by 0 days.

(21) Appl. No.: 13/726,044

(22) Filed: Dec. 22, 2012

Related U.S. Application Data

(60) Provisional application No. 61/701,687, filed on Sep. 16, 2012, provisional application No. 61/713,602, filed on Oct. 14, 2012, provisional application No. 61/723,832, filed on Nov. 8, 2012.

(51) Int. Cl.  
*G02B 6/26* (2006.01)  
*G02B 6/42* (2006.01)

(52) U.S. Cl.  
USPC ............................................. 385/32; 385/43

(58) Field of Classification Search  
USPC ..................................................... 385/32, 43  
See application file for complete search history.

(56) References Cited

U.S. PATENT DOCUMENTS

| | | | |
|---|---|---|---|
| 3,310,439 A | 3/1967 | Seney | |
| 4,251,679 A | 2/1981 | Zwan | |
| 4,332,973 A | 6/1982 | Sater | |
| 4,409,422 A | 10/1983 | Sater | |
| 5,636,299 A * | 6/1997 | Bueno et al. | 385/15 |
| 5,930,433 A | 7/1999 | Williamson et al. | |
| 6,323,833 B1 * | 11/2001 | Takeuchi et al. | 345/84 |
| 6,480,345 B2 * | 11/2002 | Kawashima et al. | 359/802 |
| 6,646,272 B2 * | 11/2003 | Rushbrooke et al. | 250/461.1 |
| 6,858,828 B2 * | 2/2005 | Roy et al. | 250/208.1 |

(Continued)

FOREIGN PATENT DOCUMENTS

| | | |
|---|---|---|
| DE | 4409698 | 3/1994 |
| GB | 24584526 | 4/2012 |
| WO | WO2010076791 | 7/2010 |

OTHER PUBLICATIONS

"Plasmonic Rainbow Trapping Structures for Light Localization and Spectrum Splitting" Min Seok Jang and Harry Atwater, Physical Review Letters 107, 207401 (2011), Nov. 11, 2011, American Physical Society.

(Continued)

*Primary Examiner* — Daniel Petkovsek  
(74) *Attorney, Agent, or Firm* — Shalom Wretsberger; Saltamar Innovations (57) ABSTRACT

A pixel structure, displays, and display panels comprising a plurality of pixel structures, are provided. The pixel structure comprising: a Continuous Resonant Trap Refractor waveguide having a tapered core with an aperture for emitting the light and a narrower end or tip, the tapered core having cladding disposed thereabout, the core and the cladding both being transmissive of light; and a plurality of light sources disposed for coupling light into the core via the cladding. Preferably the light sources are disposed within layers of substrate, which may form lateral waveguides. An optional plurality of light sources disposed at an angle offers emitting a simultaneous plurality of images, each having a different polarization, for 3D viewing, and other desired emissions at varying polarizations.

19 Claims, 6 Drawing Sheets

(56) References Cited

U.S. PATENT DOCUMENTS

| | | | |
|---|---|---|---|
| 7,220,035 B2 * | 5/2007 | Buelow et al. | 362/560 |
| 7,799,988 B2 | 9/2010 | Cutler | |
| 7,902,453 B2 | 3/2011 | Dutta | |
| 7,943,847 B2 | 5/2011 | Kempa et al. | |
| 7,999,174 B2 | 8/2011 | Moslehi | |
| 8,212,217 B2 * | 7/2012 | Scherer et al. | 250/370.01 |
| 8,290,318 B2 * | 10/2012 | Vasylyev | 385/33 |
| 2005/0207699 A1 | 9/2005 | Painter et al. | |
| 2008/0047601 A1 | 2/2008 | Nag et al. | |
| 2009/0199893 A1 | 8/2009 | Bita et al. | |
| 2009/0301549 A1 | 12/2009 | Moslehi | |
| 2010/0155602 A1 | 6/2010 | Scherer et al. | |
| 2010/0202734 A1 * | 8/2010 | DeCorby | 385/43 |
| 2012/0006382 A1 | 1/2012 | Dagli et al. | |
| 2012/0135512 A1 | 5/2012 | Vaylyev | |

OTHER PUBLICATIONS

"Visible-band dispersion by a tapered air-core Bragg waveguide" B. Drobot, A. Melnyk, M. Zhang, T.W. Allen, and R.G. DeCorby, Oct. 8, 2012 / vol. 20, No. 21 / Optics Express 23906, © 2012 Optical Society of America.

"Trapping a Rainbow: Researchers Slow Broadband Light Waves With Nanoplasmonic Structures", Science Daily Mar. 15, 2011, www.sciencedily.com /releases/2011/03/110314152921.htm.

Extraordinary optical transmission through metal films with sub wavelength holes and "slits" , A. S. Vengurlekar, Tata Institute of Fundamental Research, Mumbai 400005, MS Completed in Oct. 2009, to appear in Current Science, J. of Ind. Acad .Science.

"Efficiency and finite size effects in enhanced transmission through subwavelength apertures", F. Przybilla, A. Degiron, C. Genet, T.W. Ebbesen, F. de Léon-Pŕerez, J. Bravo-Abad, F. J.García-Vidal, L. Martín-Moreno. Jun. 23, 2008 / vol. 16, No. 13/ Optics Express 9571, © 2008 Optical Society of America.

"DOE Solar Energy Technologies program Peer Review" Harry A. Attwater, Nathan S. Lewis, Mar. 9-10, 2009 Denver, CO, US Department of Energy.

"Light transmission through perforated metal thin films made by island lithography", Mino Green, Futing Yi, 2004 Elsevier B.V. Available online Jul. 2, 2004.

"Trapping light in plasmonic waveguides", Junghyun Park, Kyoung-Youm Kim, Il-Min Lee, Hyunmin Na, Seung-Yeol Lee, and Byoungho Lee, Jan. 18, 2010 / vol. 18, No. 2 / Optics Express 598, © 2010 Optical Society of America.

"Stopping light by an air waveguide with anisotropic metamaterial cladding" Tian Jiang, Junming Zhao and Yijun Feng, Jan. 5, 2009 / vol. 17, No. 1 / Optics Express 170, © 2008 Optical Society of America.

"Light transmission through a single cylindrical hole in a metallic film" F. J. García de Abajo Dec. 2002 / vol. 10, No. 25 / Optics Express 1475 © 2002 Optical Society of America.

"Transmission of light through thin silver films via surface plasmon-polaritons", Armando Giannattasio, Ian R. Hooper, and William L. Barnes. Nov. 29, 2004 / vol. 12, No. 24 / Optics Express 5881, © 2004 Optical Society of America.

United Kingdom Intellectual Property Office Search Report in GB 1222557.9, "Continuous Resonant Trap Refractor, Waveguide Based Energy Detectors, Energy Conversion Cells, and Display Panels Using Same", Feb. 1, 2013.

* cited by examiner

LIGHT EMITTING PIXEL STRUCTURE USING TAPERED LIGHT WAVEGUIDES, AND DEVICES USING SAME

FIELD OF THE INVENTION

The present invention relates generally to pixel structures using tapered core waveguides, to light sources disposed within waveguides, and more particularly to displays and display panels using same.

BACKGROUND OF THE INVENTION

Display devices are ubiquitous and are present in numerous devices ranging from telephones and computing devices, to televisions, control devices, individual microdisplays for placement near the viewer's eye and the like. Most displays today are based on flat panel technologies, such as LCD (Liquid Crystal Display), LED (Light Emitting Diodes), including the organic variety known as OLED, plasma, and the like. Polychromatic displays of this type use a plurality of individually addressable monochromatic pixels, commonly RGB—Red, Green, and Blue—to provide an illusion of 'true-color'. As long as the distance between the individual colored pixels is small, the human mind merges the individual pixels. However, such mixing requires a viewing distance from the display device and, generally, the larger the display area the more noticeable the effect of the three separate colors in a pixel. Moreover, while weighing but a fraction of the weight and consuming but a fraction of the power of old cathode ray tube displays, current displays often consume significant energy and still require significant bulk. Such displays also commonly utilize a plurality of expensive transparent conductor material as electrodes for energizing a specific location within the display.

Lately, stereoscopic displays appear in many devices. Such displays provide an illusion of three dimensional objects and are colloquially known as '3D displays', or 3 dimensional displays. It is noted that those devices are not truly three dimensional but create the three dimensional illusion at the viewer's brain, and in these specifications the terms 3D, three dimensional, and stereoscopic will be used interchangeably. 3D display systems provide two streams of video, separating the flow of each of the video streams to a different eye of the viewer. Oftentimes this is carried out by controlling shutters located in eyeglasses worn by the viewer. In some other embodiments, light switches, slots, and other effects are placed in front of the television screen. A common method for obtaining the 3D displays utilizes 'passive' eyeglasses which separate the image for each eye based on light polarization. By way of example, a first image may be displayed with horizontal polarization while a second, slightly displaced image is displayed using light at a vertical polarization. The viewer wears glasses with matching polarization for each eye, thus allowing each eye to see only the image which is directed to it. In certain embodiments, circular polarization is utilized to allow a 3D illusion even when the user tilts the head. Active 3D systems, i.e. the systems that use controlled shutters in the eyeglasses, provide a better viewing experience, but the eyeglasses require power and are heavier and more expensive than the passive eyeglasses based systems.

Light is one form of radiant energy which may be considered as an alternating electromagnetic radiation at very high frequency. Humans perceive different light frequencies as different colors, and there is a large amount of radiation that is not perceived by humans, generally known as UV (Ultra Violet) and IR (Infra Red), and the term light will be extended thereto. Visible light ranges generally between 760-390 nm and corresponds to the peak intensity of solar radiation transmitted through the atmosphere. Long wave infrared radiation ranges from the extreme far end of 33 μm (10 THz; millimeter radio waves) to about 760 nm and solar radiation contains a significant amount of total energy below about 3 μm. It is clear, therefore that radiant energy as used herein covers a very broad spectrum of radiation. Clearly specific applications would be required to cover only portions of this spectrum. By way of example, for solar energy applications the spectral range of interest will likely be a spectrum containing most if not all of the solar spectrum available at the location where the solar cell is to be deployed, or the portion thereof which is economically used by the device at hand typically 3 μm to 300 nm. The spectral range of interest for most display devices is within the visible light, even if some special applications demand extending the spectral range. In some applications a specific wavelength may be desirably attenuated, such as by way of example reduction of blue light for pilot related devices. Yet for devices directed to heat energy recovery, it is likely that only the infra-red portion of the spectral range is of interest. Similarly, the spectral range of interest may be applicable to certain portions of a device. By way of example a device may be directed to a broad spectrum, but portions thereof may be directed to a narrower spectrum, and the spectral range of interest is thus limited to the range of interest of the portion of the device. By way of a non-limiting example, a television may occupy a display portion that utilizes CRTR's as described below and additional emissions such as audio outputs. The spectral range of interest of the CRTR may only extend to the visible range, even if the device as a whole includes the aural range as well. It is seen, therefore, that the application at hand determines the spectral range of interest for which an apparatus utilizing the invention is directed to.

Therefore, the spectral range of interest is defined herein as relating to any portion or portions of the total available spectrum of frequencies which is being utilized by the application and/or apparatus at hand, and which is desired to be detected and/or emitted utilizing the technologies, apparatuses, and/or methods of the invention(s) described herein, or their equivalents.

The term "stationary resonance condition" should be construed as relating to a situation in a waveguide where the frequency of the guided wave is sufficiently close to the local cutoff frequency of the waveguide, such that the guided wave reflects repeatedly between opposing surfaces of the guide. The corresponding energy velocity along the waveguide propagation axis is significantly lower than the speed of light in the bulk material of the waveguide and approaches zero at the stationary resonance condition. Notably, complete stationary resonant condition is an ideal limiting case which is almost never achieved.

The term Continuous Resonant Trap Refractor (CRTR) should be construed as relating to a waveguide having a tapered core, the core having a base face and a tip. The larger face of the tapered waveguide core will be generally referred to as the aperture, and the smaller face, or point, will generally be referred to as the tip. Light travels along the depth direction extending between the aperture and the tip, however the light may travel towards the aperture; or away therefrom. For the purposes of these specifications, the depth increases from the aperture towards the tip such that larger depth implies greater distance from the aperture. The term 'tapered core waveguide' requires only that the waveguide core be tapered, and the overall dimensions or shape of the CRTR may be of any convenient shape.

A distance from the aperture along the depth dimension, at which the width of the waveguide in at least one dimension would be the critical width, which will block light of a given frequency from advancing further down towards the tip, is referred to in these specification as 'emission depth' for this frequency. The emission depth is also the depth where energy of a given frequency injected to the CRTR via the cladding would best couple to the CRTR core and travel towards the aperture. The width of the CRTR core which causes the energy to be emitted through the cladding or is coupled through the cladding from outside the CRTR for a wave of a given frequency is termed 'emission width' for that wave. Such emission is termed 'cladding penetration state'. When polychromatic light is admitted through the CRTR aperture, lower frequency waves will reach their emission depth before higher frequency waves. As the wave energy departs the CRTR at its emission depth, lower frequency light would penetrate the cladding and exit at a shallower depth than higher frequency light. Thus, the CRTR will provide spatially separated spectrum along its cladding. In addition, the CRTR refracts the spatially separated light away from the axis of the CRTR extending from the aperture toward the tip. Conversely, light coupled to the core via the cladding at the emission depth will travel from the emission depth towards the aperture, and different frequencies coupled through the cladding will be mixed and emitted through the aperture. Coupling light into the CRTR core from the cladding will be related as 'injecting' or 'inserting' energy into the CRTR.

Therefore, for a given CRTR spectral range of interest $S_i$, ranging between $\lambda_{max}$ to $\lambda_{min}$, which represent respectively the longest and shortest wavelengths of the spectral range of interest as measured in the core material, wherein $\lambda'$ is at least one wavelength in $S_i$, the dimensions of a CRTR taper are bounded such that a. the aperture size $\psi$ must exceed the size of one half of $\lambda_{max}$;

b. the CRTR core size must also be reduced to at least a size which is smaller than or equal to one half of wavelength $\lambda'$.

Thus the CRTR dimensions must meet at least the boundary of $$\{\zeta \leq \lambda'/2 < \lambda_{max}/2 \leq \psi\}$$

where the CRTR sizes defined above relate to a size in at least one dimension in a plane normal to the depth dimension. It is noted that certain wavelengths in $S_i$ may not meet the condition b. above and in such cases all energy for which the wavelength $\lambda' < 2 \zeta$ is transferred into or out of the tapered waveguide vertically through a truncated tip. It is noted that for a dielectric clad waveguide the effective width is slightly larger than the physical width due to wave penetration into the cladding, as is well known in the art, and the dimensions, $\zeta$ and $\psi$ account, in this construction, for the waveguiding effects of the cladding.

Cladding penetration may be caused by the wave approaching stationary resonant condition or when the wave reaches a critical angle which depends on the core/cladding interface. In certain embodiments cladding may be removed at a predetermined depth (core width) to achieve desired propagation characteristics.

CRTR's were first described in U.S. provisional patent application No. 61/701,687 and later in more detail in U.S. provisional patent applications No. 61/718,181, and 61/723,832, and in non-provisional U.S. patent application Ser. No. 13/685,691 to the present inventors. All the above mentioned patent applications are incorporated herein by reference in their entirety.

There is therefore a clear and heretofore unanswered need for better technology, devices, and methods of manufacturer which will solve the shortcomings of the known art for displays in general and also for stereoscopic 3D displays.

SUMMARY OF THE INVENTION

It is therefore an object of the invention to provide a device and a technology to improve flat panel displays which is relatively inexpensive, easy to manufacture, and which provides true-color pixels. The term true-color will imply that the light viewed by the viewer is emitted towards the viewer from a single aperture as colored light, rather than from three separate pixels placed proximal to each other, each providing a single primary color. It is also an object of the present invention to provide relatively inexpensive display panels capable of displaying simultaneously or nearly simultaneously, two video streams in a manner that will facilitate stereoscopic vision by a viewer, preferably wearing passive eyeglasses.

As displays and display panels comprise of a plurality of pixel structures, there is provided a pixel structure for emitting light within a spectral range of interest, the structure comprising: a CRTR waveguide having a tapered core with an aperture at its wider end for emitting the light; a depth dimension extending from the aperture towards the narrower end of the tapered core, the tapered core having cladding disposed thereabout, the core and the cladding both being transmissive of light; and a plurality of light sources disposed for coupling light into the CRTR core via the cladding.

The light sources are generally narrow band light sources, at least two of which being disposed about the cladding and positioned to allow coupling of light to the core via the cladding at differing heights, the two narrow band light sources controllably emitting light of different colors. The core is tapered in at least one dimension, to cause light injected via the cladding to couple thereto at a frequency dependent emission depth, wherein injected light from the plurality of light sources will emit via the aperture.

The term light sources relates to any device which either emits or controls the amount of light being coupled to the core via the cladding. A narrow band light source may be an actual emitter such as Light Emitting Diode (LED), Organic LED (OLED), cold cathode tube, laser, electro-luminescent source, fluorescent source, gas discharge source, chemical phosphorescence, and the like. However the term also extends to any kind of light modulators such as mirrors, LCD, shutters, light valves, Kerr effect modulators, Pockels effect modulators; and the like, which control the amount of light entering and/or reflected into the tapered core waveguide via the cladding, or reflected thereto.

In some embodiments the tapered core is round, but in others the tapered core may have an asymmetrical or multi-faceted cross section, whether symmetrical or asymmetrical. In some of those embodiments at least two individually controlled light sources are disposed to couple light into the core at an angle to each other, for providing light output having individually controlled polarization relating to output of the individually controlled light sources. Commonly, in such embodiments the CRTR core is multi-faceted and/or asymmetrical.

Thus, by way of example, certain embodiments may have two specific master light sources of the same color per pixel, disposed at 90° to each other about a single CRTR, which will provide separate horizontally and vertically polarized light streams to be emitted through the aperture, in accordance with the light outputted by the two main light sources. In certain embodiments auxiliary light sources are disposed in angular proximity to the two main light sources, or at angular proximity to their reciprocal. The auxiliary sources are fed with the same signal, such that they create a wider polarization angle in each of the two major axes of the two main light sources. Alternatively the auxiliary light sources may be fed the same signal which is fed to the main axis light source, but with a slight phase difference, so as to cause a slight delay at the slanted axis. Therefore, the light stream from the auxiliary light sources would couple to the core at an angular proximity to the respective main stream. If the signal fed to the light sources is identical to the signal of the main light source or is phased therefrom, this will cause the light stream to similarly be identical to the main light stream or be at a phase angle thereto. The skilled in the art would recognize that this result also suggests a CRTR core constructed to emit the additional polarization which may be achieved, by way of example, by providing additional facets to the core.

In one aspect of the present invention there is provided a display device comprising a plurality of any of the pixel structures described herein, disposed within a substrate, and a plurality of light sources disposed within the substrate. Optionally, the substrate comprises a plurality of superposed stacked lateral layers. In certain embodiments a plurality of narrow band light sources, at least two of which being disposed within the stacked layers and positioned to allow coupling of light to the tapered core via the cladding at differing heights, the two narrow band light sources controllably emitting light of different colors. Optionally the superposed layers of the substrate form a plurality of lateral waveguides.

The CRTR core is tapered in at least one dimension, to cause light injected via the cladding to couple thereto at a frequency-dependent emission depth, wherein injected light from the plurality of light sources will emit via the aperture.

In some embodiments the plurality of light emitters comprises at least red, green and blue light emitters respectively.

In some embodiments at least some of the plurality of the controlled emitters comprise a light valve operational to modulate the entry of light from a light source into at least one of the tapered core waveguides, and wherein a plurality of light emitters each having a light valve utilize a single light source. By way of non-limiting example light valve may be LCD, mirrors, controlled grating, and the like.

SHORT DESCRIPTION OF DRAWINGS

The summary above and the following detailed description will be better understood in view of the enclosed drawings which depict details of preferred embodiments. It should however be noted that the invention is not limited to the precise arrangement shown in the drawings and that the drawings are provided merely as examples.

FIG. 4a depicts an arrangement of light sources disposed about the CRTR, while

FIGS. 5a, 5b, 5c and 5d either depict light sources, light modulators, or light detectors disposed about the tapered waveguide at preselected angles therebetween to provide generation and/or response to polarized light.

DETAILED DESCRIPTION

Certain embodiments of the invention will be described herein by way of example to increase the understanding of different aspects of the invention.

Figure 1:
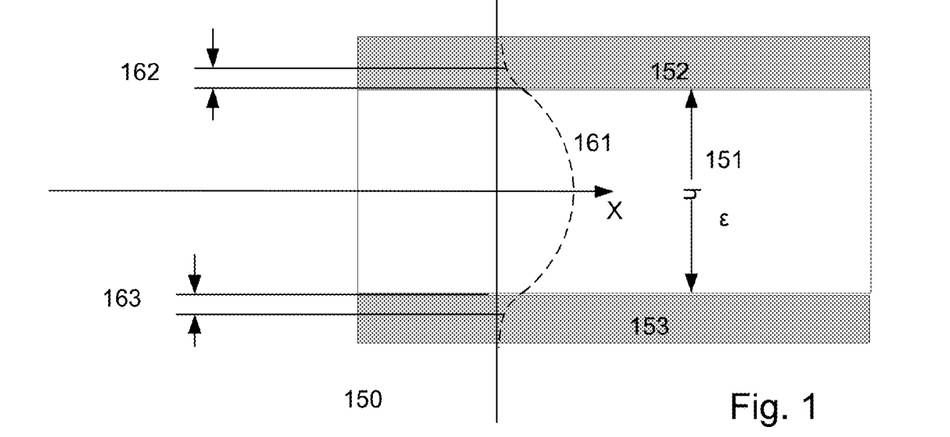
FIG. 1 depicts a two-dimensional waveguide formed between two bounding layers.

FIG. 1 depicts a short region of waveguide with insignificant variation of thickness within a CRTR, and is provided for simple explanation of the propagation characteristics of radiant energy within such waveguides. It alternately depicts a region of a lateral planar waveguide in which source light to be emitted is brought to the CRTR FIG. 1 shows a waveguide 150 comprising a waveguide core material 151 of thickness, h, formed between dielectric cladding materials 152 and 153. In some embodiments the dielectric cladding materials may alternately be conductors, in which case $\delta_N$, below, is zero. In yet another alternative, the cladding may comprise a dielectric having finite penetration 162 and 163 of the wave outside the physical core 151. In such cases, the equivalent width of the core is $(h+\delta_N)$ where $\delta_N$ is the sum of the finite penetration depths.

The critical frequency of the $N^{th}$ order waveguide mode, $F_{CN}$, is obtained as $$F_{CN} = NV_B/2(h+\delta_N),$$

where $\delta_N$ 162, 163 represents the effect of finite extent of mode profile 161 into the neighboring dielectric regions, and h represents the thickness of the core region. It is seen therefore that the qualitative properties are similar to those of the conductor clad waveguide based detectors. In the most preferred embodiments N=1.

The speed of electromagnetic plane wave propagation in the bulk of the material is expressed as $V_b = 300*10^6/\sqrt{\in}$ meters per second. It is noted that $\sqrt{\in}$ is the refractive index (commonly denoted as 'k' in semiconductor manufacture field, and as 'n' in the field of optics).

Below this cutoff frequency an electromagnetic wave cannot travel laterally along the waveguide X axis. At this critical frequency, a guided plane wave reflects repeatedly between the upper and lower conductors but makes no lateral progress along the waveguide. Above the cutoff frequency a wave travels with a dispersion equation $$\beta_N = 2\pi\sqrt{(F^2 - F_{CN}^2)}$$

Wherein $\beta_N$ is wavenumber of the $N^{th}$ order mode, F being the wave frequency, and $F_{CN}$ is the cutoff frequency as described above.

The wave has N half-wavelengths of variation across the effective thickness, $h+\delta_N$, and propagates with a wavelength along the guide $$\lambda_{GN} = 2\pi/\beta_N$$

Higher order modes have larger values of N and have higher cutoff frequencies for the same thickness waveguide. An incident plane wave at a low angle of incidence will couple best to the most uniform waveguide mode, so the fundamental mode (N=1) is most readily coupled for incidence parallel to the waveguide.

Figure 2:
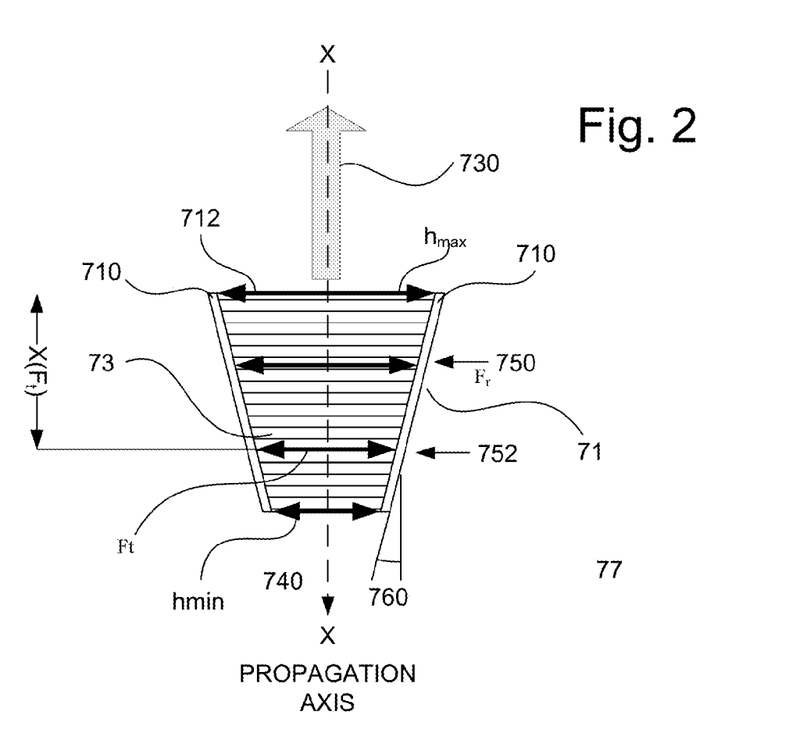
FIG. 2 depicts a cutout of a simplified CRTR

FIG. 2 depicts a simplified example of a tapered waveguide 71, with simplified wave propagation therein. The waveguide comprises a transparent dielectric material based tapered core 73, bounded between cladding walls 710, which are either conducting or having a lower refractive index than the index of the core, or comprise 'spotted' metal as described below. The core region may comprise a plurality of dielectric regions.

At its wide base which is the aperture, the waveguide has a thickness $h_{max}$, and thus the lowest cutoff frequency $F_{rain}$. At the tip the waveguide thickness $h_{min}$ dictates a higher cutoff frequency $F_{max}$. Between the aperture and the narrow tip, the cutoff frequency is continually increased due to the reduced thickness.

Thus, examining the behavior of a wave of arbitrary frequency $F_t$, where $F_{min} < F_t < F_{max}$, which is injected 752 to the into the tapered core of the waveguide at a depth $X(F_t)$, the wave will travel in the waveguide towards the aperture 712. In order to provide the best coupling, the light of frequency $F_t$ should be injected into the tapered core at a slightly shallower depth than the cutoff depth $X(F_t)$ for the frequency $F_t$.

Light of other colors injected into the cladding will mix within the core. Thus, by way of example, light of frequency $F_r$, injected through the cladding into the tapered waveguide core, will mix with the light of $F_t$. Therefore, assuming that the core material is equally transparent to all light of the spectral range of interest, and that the optical loses in the core are negligible, the light 730 emitted from the CRTR aperture would be the summation of the light injected into the core. The skilled in the art would readily recognize that by placing primary color light sources about the cladding any color light may be emitted through the aperture. Unequal transparency or injection efficiency may be compensated by pre-weighting the amplitudes of the primary color signal sources.

It is noted that in most if not all practical cladding materials, the light will refract when entering and exiting the cladding. Therefore, the light source or light detectors may be located at a different depth than the point of desired entry into the core.

Ideal behavior of CRTR may be modeled in more detailed fashion as a series of successively narrower uniform waveguides provided that the rate of taper is slow compared to the wavelength, regardless of the function describing the taper. Therefore the light 750, 752, will be emitted through the aperture Furthermore, the waveguide may be extended along the depth dimension so as to provide larger aperture. Alternatively an optional additional waveguide (not shown) may be coupled to the aperture to farther disperse the light outputted from the aperture and provide larger emission area and/or increased viewing angles.

For typical metals at 1000 THz (~300 nm UV) the skin depth is only ~2 nm and at 100 THz (~3 μm IR) the skin depth is ~6 nm. A suitably conductive layer of metal, such as gold, silver, copper or aluminum by way of example, would have a minimum thickness of approximately 30-50 nm and would have a transmission of $4 \times 10^{-18}$ at 300 nm UV. 4 nm metal layers would have a transmission coefficient of ~2% at 300 nm UV. It is desirable that the transmission coefficient be much larger than the absorption losses in the core material 73. Thinner layers could be deposited if the metal cladding is not relied upon for conducting the power required to produce the source radiant energy. In many cases there is a critical thickness to obtain a continuous film of metal below this thickness small dots of metal atoms aggregate. Such a "spotted" surface will be semi-transmissive and the transmissivity will be dependent on a number of factors, one of which is incidence angle. Therefore such a partial coverage of conductor is a frequency selective, effective cladding material 710 on a CRTR core since the incidence angle increases as the frequency approaches the cutoff frequency. Such "spotted" metal cladding should therefore be considered transmissive for the purposes of the present application.

Figure 3:
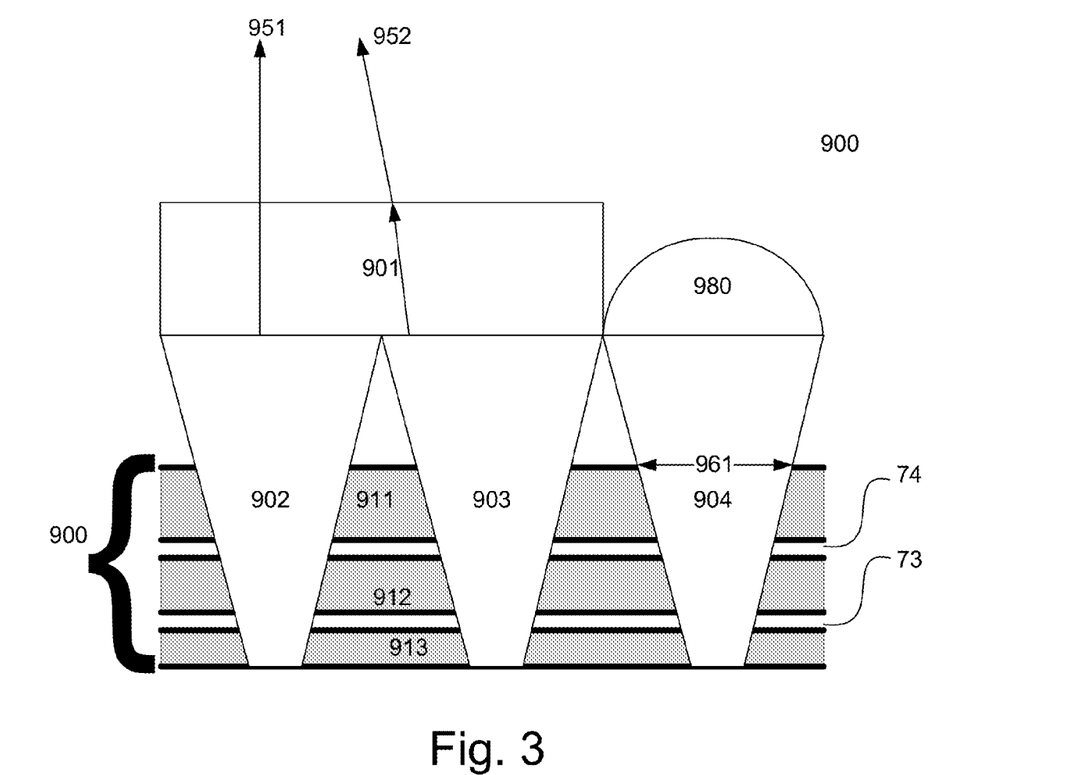
FIG. 3 depicts a simplified basic embodiment of a plurality of CRTR's embedded within lateral waveguides, with optional covers applied to CRTR's apertures.

While the light sources may be located in any convenient manner about the CRTR, FIG. 3 depicts a simplified basic embodiment that is easily manufactured, offers convenient form factor, and may be modified to provide added functionality.

Tapered waveguides 902, 903, and 904 are disposed in a sheet like substrate material 900 which comprises a plurality of stacked layers. Each of the layers, 913, 912, and 911 contains at least one light source. In a common embodiment, layer 913 will contain blue light sources, layer 912 will contain green light sources, while layer 911 will contain red light sources, providing the common RGB primary light combination. However, the selection of light sources frequency and type, as well as the number of layers are a matter of technical choice. Layer stack 900 may also be disposed upon a rigid support (not shown). Electrical connections to the light sources may reside on a dedicated connection layer (not shown) or as additional layers 73, 74 interspersed between the light-source layers 911, 912, and 913. While the drawings depict a small number of CRTR based pixels, the skilled in the art would readily recognize that placing a plurality of CRTR based pixels onto a surface would form a display. The display may be flat, as shown by way of example in FIG. 3 and others, or conform to any desired shape, including flexible cloth and the like. In some cases the substrate comprises a plurality of layered stack. The layered stack may optionally form a plurality of lateral waveguides. The skilled in the art would recognize that forming such a stacked layer of lateral waveguides is a matter of selection of materials for the layer, such that waveguides are formed with cores and cladding. The waveguides are substantially orthogonal to the depth direction of the CRTR, at the height in which they couple light thereto.

Optionally, the CRTR's may extend above the layered substrate 900 in order to create more contiguous light-emitting surface. If desired, microlenses 980 may optionally be disposed over the CRTR aperture 961, and any optional extension thereof. Protective material or an optical filter 901 may optionally be disposed on top of the CRTR.

Figure 4A:
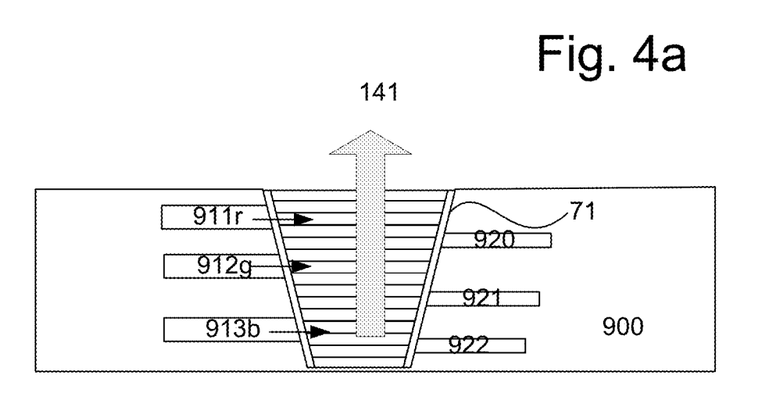
Figure 4B:
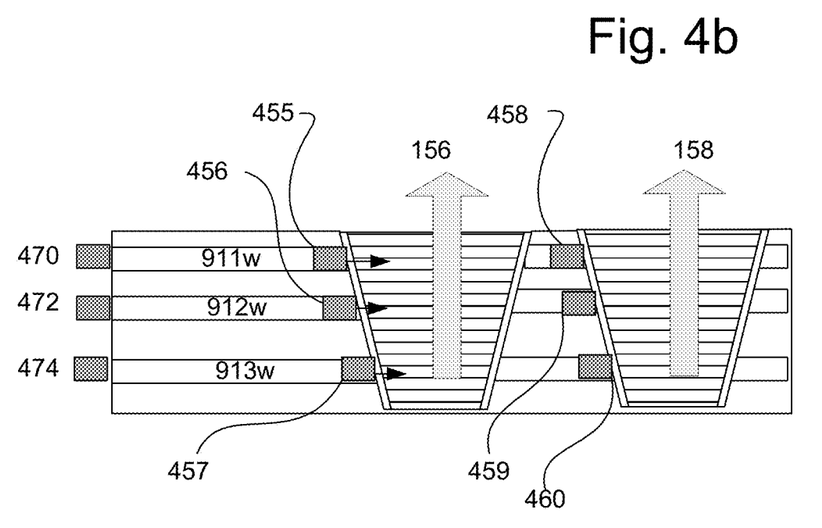
FIG. 4b depicts a simplified embodiment utilizing light modulators.

In some embodiments individual light sources, 911$r$, 912$g$, and 913$b$, which may be embodied by any convenient device such LED, OLED, electroluminescence, and the like, are disposed next to the CRTR, as depicted in FIG. 4$a$. In certain other embodiments, such as depicted in FIG. 4$b$, the light sources comprise a combination of a light source and a light modulator which controls the amount of light of each frequency which is injected to the CRTR via the cladding. In the embodiment of FIG. 4$b$ light sources 470, 472, and 474, each are coupled to lateral waveguides 911$w$, 912$w$, and 913$w$ respectively. Light modulators 455-460 control and modulate the amount of light entering each individual CRTR. Light modulators are implemented by any convenient method, such as LCD, mirrors, shutters, light valves, Kerr effect modulators, Pockels effect modulators, and the like. Light modulators may act to controllably modulate the light passage, either as an on/off switch or in incremental analog fashion, allowing passage of varying amount of light according to the control signal supplied thereto. It is noted that while preferably light sources 470, 472, and 474 each emit a narrow band of color, such construction is not necessary, and broadband light sources may be utilized, as the CRTR will tend to couple best the light about the CRTR cutoff frequency of the corresponding depth of the waveguide 911$w$, 912$w$, and 913$w$. Thus if desired even a single source of white light may be coupled to the lateral waveguides. LCD's and many other light modulators consume less energy then OLED's for each individual pixel and thus such embodiments are appropriate to applications where energy conservation is paramount. It is noted that the term 'light sources' as it relates to a source for injecting light into the CRTR from the cladding extends to such combinations of one or more light sources shared between a plurality of CRTR based pixels, in combination with light modulators, for controlling the amount of light entering the cladding. Furthermore, if the modulated light is injected into the cladding at a specific depth range, such light source should be considered as a narrow band light source, as only a light of proper frequency, slightly below the local cutoff frequency of the CRTR, will be admitted into the CRTR core for emission through the aperture.

Figures 5A, 5B, 5C:
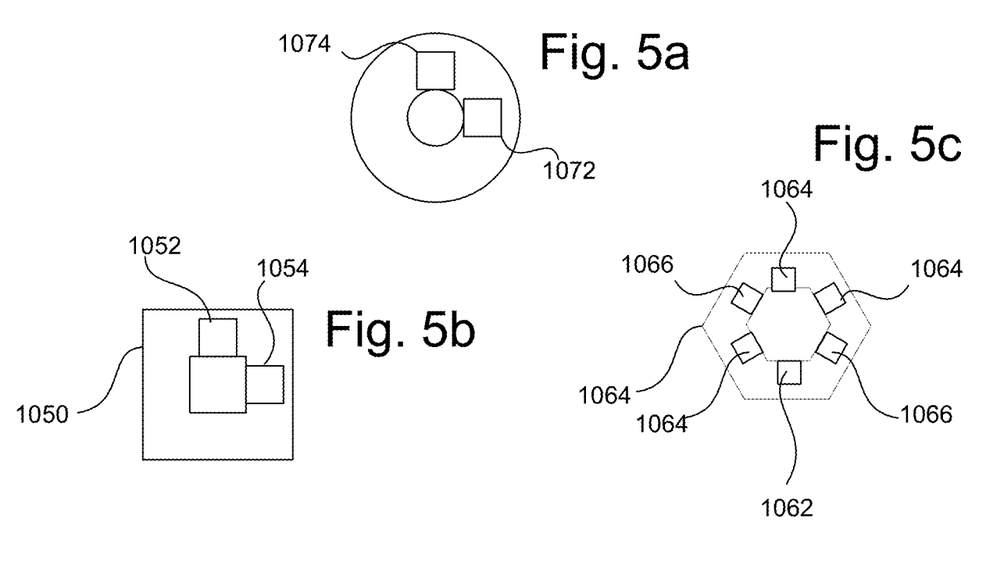

Placing a plurality of light source at different angular locations about the depth dimension of the CRTR, would result in polarized light corresponding to the location of the light sources. An exemplary top view is provided in FIG. 5a, where light sources 1072 and 1074 are disposed about the CRTR at 90° relative angle. This will result in individually controlled horizontal and vertical polarized light emitted from the CRTR aperture. If multi-faceted CRTR cross sections are used, the polarization-dependent coupling will be more pronounced. Thus, by way of example, FIG. 5b depicts a top view of a square CRTR 1050 having two light sources, 1052 and 1054, which are disposed about the faces of the CRTR cladding, such that light admitted into the CRTR from source 1052 is radiated via the aperture at 90° to light admitted to the CRTR from light source 1054. The skilled in the art would readily recognize that a CRTR having a hexagon cross section would provide light polarized at 120° intervals, as depicted by hexagonal CRTR 1060 in FIG. 5c, where each of the light source pairs 1062, 1064, and 1066 emits light polarized at 120° respectively. Similarly, octagonal CRTR would provide 45° relative polarization separation, and the like.

Therefore, a 3D stereoscopic pixel may be easily implemented by providing two images to different light sources about the cladding, and providing the viewer with appropriate glasses that will filter the polarized light from each image to a different eye. Circular polarization may be simulated by circularly surrounding the CRTR with a plurality of light sources, and switching the image data between the light sources. As high speed switching is required, such simulated circular polarization may be achieved by connecting the light sources in series and feeding very short pulses to the series connected light sources.

Figure 5D:
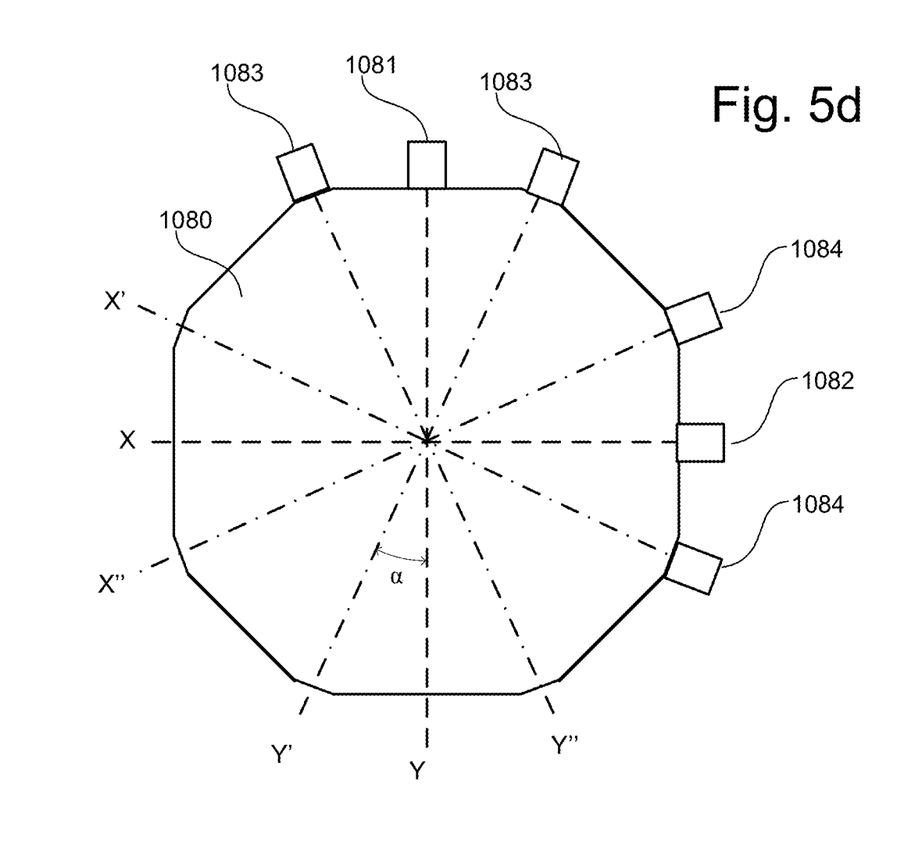
FIG. 5d depicts auxiliary light sources for embodiments providing broad polarization angle.

Vertical and horizontal polarization are sufficient to provide the desired 3D optical separation with matching vertically and horizontally polarized filters placed in front of the user's eyes, however this works best when the user's head is aligned with the CRTR output. To allow more freedom, FIG. 5d provides a CRTR core 1080 cross section at a single frequency, where vertical 1081 and horizontal 1082 main light sources are coupled into the CRTR core (the cladding is omitted for clarity, as in FIGS. 5a, 5b, and 5c), and injecting light into the core along axis Y and X respectively. Auxiliary light source are disposed at a slight angle to the main light sources, and are coupled to facets of the core. Therefore, by way of example, auxiliary light sources 1083 may be disposed at a slight angle to main vertical light source 1081, and injecting light along the axis Y' and Y''. The auxiliary sources may be fed the same signal as the signal fed to the main vertical light source 1081 or very slightly phased therefrom. Similarly auxiliary light sources 1084 may be disposed at slight angles to horizontal main light source 1081, and inject light into the core along axis X' and X''. The auxiliary light sources may be fed the same signal as the main light source 1082, or very slightly phased signal therefrom.

Furthermore, in certain embodiments the light sources may be laser sources with small time lag between the light emitted by one of the two sources 1054-1052, 1072-1074, and 1081-1082. Providing extremely small switching and/or modulation of such lasers may be achieved by controlling the phase differences at which the two sources are powered. The short pulses of laser can provide holographic effects due to interaction between the different lasers, especially if the laser light is being shone into refractive media. A larger plurality of laser sources is also accommodated, differing by wavelengths and/or polarization, and potentially emitted from differing CRTRS.

Figure 6:
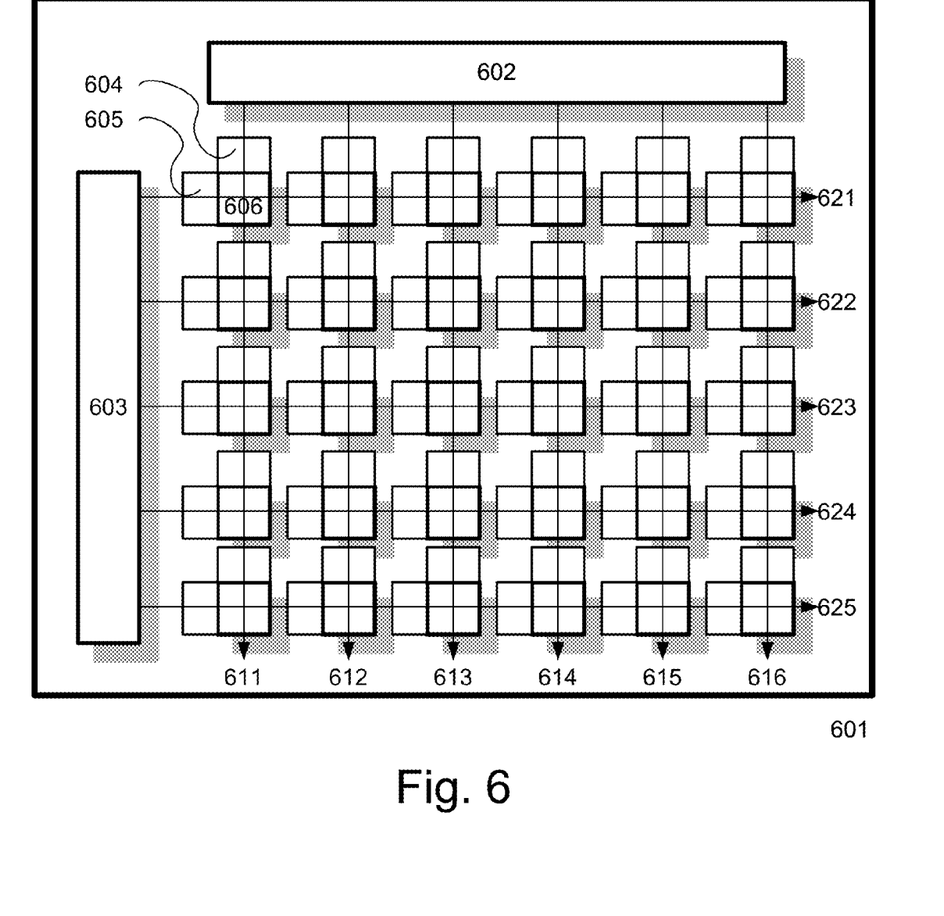
FIG. 6 illustrates a display in which long, linear CRTRs convert white light to polarized and sorted primary color light in lateral waveguides that is then selectively emitted by emitter CRTRs.

One embodiment for employing edge-fed white light to provide the primary color source energy is depicted in FIG. 6, which is a top view of a display panel. Display panel 601 has a first 602 and optionally a second 603 CRTR, having one dimension equal to that of the active display area and another dimension suitable for coupling the desired spectrum of light into the primary color waveguides (not shown). First, CRTR 602 accepts white light at the surface and refracts it to light 611, 612, 613, 614, 615, 616, propagating along the columns of CRTR emitters 606, and the like. Each such column of light comprises the full set of primary colors, sorted by color, in the appropriate layered waveguide. Second, CRTR 602 accepts white light at the surface and refracts it to light 621, 622, 623, 624, 625, propagating along the rows of CRTR emitters 606, etc. Each such row of light comprises the full set of primary colors, sorted by color, in the appropriate layered waveguide. Gate arrays 604 and 605 modulate the various colors admitted from each source into CRTR 606. Column gate array 604 defines the spectral content of a first polarization while row gate array 605 defines the spectral content of a second polarization to be emitted by CRTR 606. Similar column and row gate arrays modulate the spectral contents of first and second polarizations in additional CRTR emitters forming the displayed image.

Additional source CRTR may be located along the right and bottom edges of the display to help equalize the source energy throughout the display active area.

In certain embodiments, the CRTR taper is created with geometrical symmetry about the propagation direction axis X-X' as discussed above; however, such symmetry is not necessary and non-symmetrical multi-faceted CRTRs such as rectangular CRTRS, and even elliptical CRTR's may be utilized and such CRTR's will benefit from having the polarizing light sources of a single color be disposed at different depths to accommodate different levels of refraction in the cladding.

It is noted that it is possible to use each CRTR to emit light of a single frequency and/or polarization, while utilizing a nearby CRTR to emit light of a different frequency and/or polarization. Furthermore a single polarization and/or frequency display may be desired in certain applications, and light injected into multi-facetted CRTRs from selected directions may be utilized to achieve such effect.

Since the CRTR is a linear device, it obeys reciprocity. It is noted that light detectors located in the structural substrate are able to receive energy entering into the CRTR aperture and outputted from the CRTR at frequency selective locations. Such detectors may be used to sense incoming light or to harvest energy entering the aperture. In certain embodiments additional layers may be disposed between the light-source layers, such as between layers 911, 912, and 913 as depicted by way of example in FIG. 4a, or above or below the light-source layers. Layers 920, 921, and 922 depict lateral waveguides which form a part of the layered stack 900, but act to harvest energy from radiant energy entering the CRTR aperture. In normal operating environments, significant amounts of radiant energy ranging from the infrared (IR) to the ultraviolet (UV) spectrum are present and are likely to enter the CRTR aperture. Radiant energy of frequencies dispersed above, below, or between the emitted light of 911*r*, 912*g*, and 913*b* will reach a depth where the angle of reflection between the cladding walls will cause cladding penetration and the incoming energy will be ejected through the cladding. Selectively placed detectors, preferably disposed within lateral waveguides, will harvest the energy which may be collected and/or used for any desired purpose. It is desirable that the energy harvesting detector in such arrangement be optimized for the energy which they will receive in such embodiment. It is further desirable that the lateral waveguides in which they are disposed will be dimensioned to have a cutoff frequency slightly lower than the lowest frequency of the color band for the respective detector.

As described above, a CRTR pixel that can detect energy of certain frequency may also operate as a sensing pixel. Thus the pixel depicted in FIG. 4*a* may also act as a light detector and sensing a plurality of such pixels creates an image array sensor.

While a single CRTR can provide the dual function of emitting light and receiving energy for harvesting and/or detection, certain embodiments will dedicate a portion of the CRTR's for detection/harvesting and another portion will act as dedicated light emitters.

The skilled in the art will recognize that the operations described hereinabove as acting within the confines of merely a few pixels is but by way of explanation and that in actual use the same principles will operate on a large number of pixels.

In some embodiments utilizing waveguides such as 911, 912 and the like, the preferred lateral waveguide thickness at the fundamental mode may be too thin for low cost manufacture and it may be desirable to employ a higher order mode with a correspondingly thicker waveguide for manufacturing simplicity.

It is further noted that while the figures depict CRTRs with continuously smooth taper, different tapers may be utilized, and logarithmic, radial, non-linear, stepwise and any other arbitrary tapers which would provide the series of successively narrower waveguide regions; would trap waves of successively higher frequencies into resonance and/or emit successively higher frequencies at increasing distances from the inlet. Therefore the invention extends to such embodiments as well.

It is further noted that the arrow angles and dimensions in the drawing are provided primarily for clarity only and often do not represent the actual angle of reflected waves.

More complicated lateral waveguides are readily considered having multiple dielectric layers between conductors and are well known in the literature. Similarly waveguides formed between multiple layers of lower dielectric constant are also well known.

The skilled in the art would recognize that a display device further comprises circuits for addressing the individual light emitters, as well as wiring, charge, bias, and control circuitry, and the like.

It should be noted that the stationary resonant condition can never be reached because as the energy velocity approaches zero the time scale extends until leakage and loss conditions become dominant. As used in the present application, stationary resonance condition encompasses all conditions beyond which a guided wave cannot pass due to changes in the local waveguide cutoff frequency, and conditions wherein the wave stops being guided and is emitted via the cladding due to its proximity to such resonant condition.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

We claim:

1. A pixel structure for emitting light, the structure comprising:
    a Continuous Resonant Trap Refractor (CRTR) waveguide having a tapered core with an aperture at its wider end for emitting the light, and a depth dimension extending from the aperture towards the narrower end of the tapered core, the tapered core having cladding disposed thereabout, the core and the cladding both being transmissive of light; and,
    a plurality of light sources disposed for coupling light into the CRTR core via the cladding.

2. A pixel structure as claimed in claim 1 wherein at least two of the light sources emit light of differing frequencies, the two light sources being disposed to couple the light into the core at differing depths.

3. A pixel structure as claimed in claim 1 wherein at least one of the plurality of light sources is disposed within a plurality of superposed lateral waveguide.

4. A pixel structure as claimed in claim 1 wherein at least two light streams are being coupled into the core from at least two respective light sources, the light streams being coupled at different angular orientation.

5. A pixel structure as claimed in claim 4 wherein at least a portion of the CRTR core has a multi-faceted cross section.

6. A pixel structure as claimed in claim 4 wherein at least a portion of the CRTR core has an asymmetrical cross section.

7. A pixel structure as claimed in claim 4 wherein a first main light stream is being coupled into the core at a 90° angle to a second main light stream.

8. A pixel structure as claimed in claim 7, having at least two auxiliary light streams coupled to the core at an angular proximity to the first main light stream, wherein the auxiliary light stream is substantially identical to the respective main light stream, or at a phase angle therefrom.

9. A display comprising:
    a plurality of pixel structures as claimed in claim 4 disposed within a substrate; and,
    a plurality of light sources disposed within the substrate.

10. A display as claimed in claim 9, wherein the substrate comprises a plurality of superposed lateral waveguides, and wherein the light sources are disposed within the waveguides.

11. A pixel structure as claimed in claim 1, wherein the CRTR is disposed within a plurality of superposed lateral layers, wherein the depth dimension substantially normal to the local plane of layering of the lateral layers.

12. A pixel structure as claimed in claim 11 wherein at least some of the plurality of light sources are disposed within the plurality of the superposed lateral layers.

13. A pixel structure as claimed in claim 1, wherein at least one of the light sources is selected from a list consisting of Light Emitting Diode (LED), Organic LED (OLED), cold cathode tube, laser, electro-luminescent source, fluorescent source, gas discharge source, and chemical phosphorescence.

14. A pixel structure as claimed in claim 1 wherein at least one of the plurality of light sources comprises a light modulator.

15. A display comprising:
   a plurality of pixel structures as claimed in claim 1 disposed within a substrate; and,
   a plurality of light sources disposed within the substrate.

16. A display as claimed in claim 15, wherein the substrate comprises a plurality of superposed lateral waveguides, and wherein the light sources are disposed within the waveguides.

17. A display comprising:
   a substrate comprising a plurality of superposed lateral waveguides, having at least
   a first light source disposed in one of the plurality of lateral waveguides, and a second light source disposed in a second of the plurality of lateral waveguide;
   a plurality of pixel structures disposed within the substrate, the pixel structures comprising a Continuous Resonant Trap Refractor (CRTR) waveguide having a tapered core with an aperture at its wider end for emitting light, and a depth dimension extending from the aperture towards the narrower end of the tapered core, the tapered core having cladding disposed thereabout, the core and the cladding both being transmissive of light, the depth dimensions being substantially normal to the local plane of substrate;
   wherein the CRTR is disposed to receive light coupled thereto via the cladding, the light being received from at least the first and the second light sources at varying depth, the depth depending on the frequency of the light being coupled into the CRTR.

18. A display as claimed in claim 17, further comprising a light emitter coupling light to a plurality of light modulators, wherein at least at least two of the light modulators are associated with two different pixel structures for coupling light thereto.

19. A display as claimed in claim 17, wherein at least one of the pixel structure is being coupled to at least two primary light sources disposed at 90° to each other, each capable of producing a different light stream, for coupling the light into the core of the pixel structure.

\* \* \* \* \*